S. J. WHITE.
Whiffletree.

No. 210,651.          Patented Dec. 10, 1878.

Attest.          Fig. 4.          Inventor.

J. Wilbur Parrett
Samuel McDonald

Stephen J. White

UNITED STATES PATENT OFFICE.

STEPHEN J. WHITE, OF BELLEVILLE, ONTARIO, CANADA.

IMPROVEMENT IN WHIFFLETREES.

Specification forming part of Letters Patent No. 210,651, dated December 10, 1878; application filed April 17, 1878.

*To all whom it may concern:*

Be it known that I, STEPHEN J. WHITE, of Belleville, in the Province of Ontario, and in the Dominion of Canada, have invented certain new and useful Improvements in Whiffletrees and a new method of using the same; and do hereby declare that the following is a full, clear, and exact description thereof, reference being had to the accompanying drawings, and to the letters of reference marked thereon, making a part of this specification.

My invention relates to that class of whiffletrees which are designed for use, principally, for hauling purposes without vehicles, and which, when in use, are suspended under the horses or other animals, though mine can be used for all purposes for which whiffletrees can be used.

The object of my invention is to provide a narrow and thin but strong whiffletree, which can be adapted to animals of all forms and unequal sizes; also, to work where the ground is higher for one than the other or others, as when plowing; and also a whiffletree that can be extended, and used with three animals, when suspended under them or otherwise.

I therefore make it entirely of strong metal, which enables me to work it in a very small space, and thus avoid all injury to the animals from chafing or otherwise.

My invention consists of a combined double and triple whiffletree, to be used when animals are working abreast, which, when used as a double whiffletree, is an improved whiffletree of the class mentioned; but when combined with the attachments to constitute a treble whiffletree, and suspended, it is a new invention.

Figure 1:
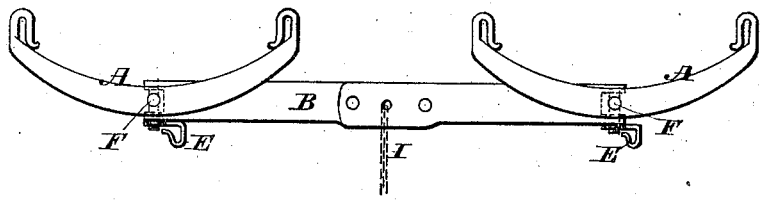
Figure 2:
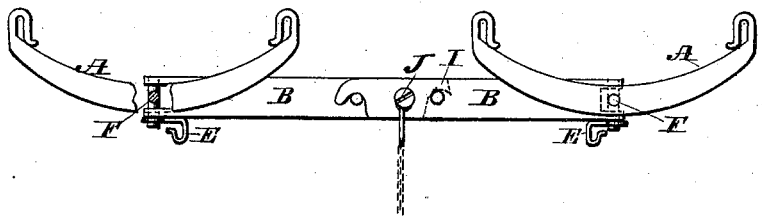

Figure 1 represents my whiffletree as I prefer to construct it when it is to be used with two animals exclusively. Fig. 2 represents the double whiffletree as constructed when it is to be extended to use for a treble whiffletree, and Fig. 3 the treble whiffletree as thus perfected.

Figure 3:
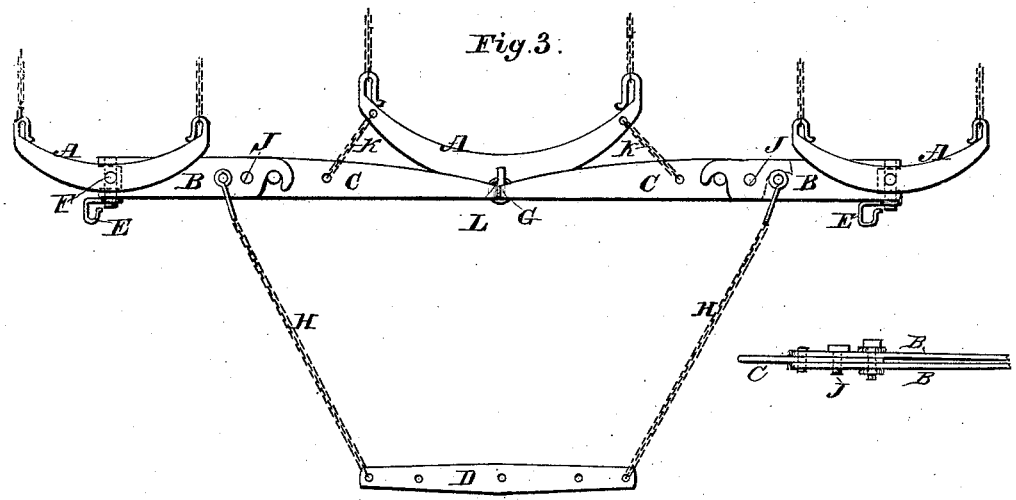
Figure 3:
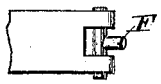

A designate the single whiffletree; B, the eveners; C, the extensions of the evener; D, the draw-bar; E, the suspension hooks or rings; F, a swivel-joint; G, a universal central joint; H, the draw-bar chains in the treble whiffletree, as represented in Fig. 3, and I the draft-chain in the double one, as represented in Figs. 1 and 2; J, an adjustable lock-joint; K, the stay-chains; and E E and L, as shown in Fig. 3, the suspension hooks or wings.

The lock-joints J, as shown in Fig. 2, and J J, as shown in Fig. 3, are formed by making the outside ends of the extension-pieces C C and the inside ends of the double evener B B in the form of a hook, which locks over a pin or bolt, as shown in Fig. 3. The object of this joint is to make a flexible or rigid evener, according to the position of the animals, except as the necessary play is given by the central joint G when three animals are used.

The whiffletrees A are constructed of iron or steel, and are fastened to the ends of the evener B by a T-pin with a nut, or it may be riveted; but the holes in the whiffletree should be countersunk, so as to leave a smooth surface on their upper side, as one of the most valuable features of my invention consists in my being able to save room by working the whiffletrees on the top of the evener or under it, at pleasure.

The double evener may be constructed of a continuous strip of metal, riveted together, as shown in Fig. 1; or when it is intended to extend it, as shown in Fig. 3, it should be united in the middle with the lock-joint, as shown in Fig. 2. On the end of the evener a clip similar to a carriage-clip is formed, through which the top of the T-bolt is inserted, the lower end of which passes through a round hole in the whiffletree, as shown in Fig. 4, and thus a hinge and swivel joint is formed, by means of which I can use the whiffletree either under or over the evener to accommodate animals of different heights or form; and when one animal is working on lower ground than the other, one can be used under and the other over the evener, and I can adjust them without removing the bolt. The extended and treble whiffletree is formed by attaching to the detached central ends of the double whiffletree two tapering strips of metal, which are looped at the center into a ring, which also receives the staple of the third whiffletree, which staple is formed on the under side of the whiffletree, so as to bring it on the top of the evener. The other ends of these strips are inserted between the two parts of the double evener, and are fastened to it by a bolt or its equivalent in the center of the lock-joint J.

When used as a double evener, the middle bolt or pin in the joint J holds the clevis for the draft-chain; and when used as a treble whiffletree, the middle pin is used to hold the evener together, and the draft-chains are fastened to the outside lock-joint pins.

The trace-chains of the center single whiffletree and the stay-chains K may be one continuous piece of chain; or a hole may be drilled in the ends of the single whiffletree to receive one end of it. The object of fastening the draft-chains H, as shown in Fig. 3, to the outside pins is to draw back the outside ends of the evener when the outside animals fall back, so that the evener will not be drawn forward; and the stay-chains K, working in combination, contribute to the same object, thus saving injury to the horses by the outside horses having the evener drawn against them. The stay-chains also prevent the evener from closing up on the legs of the center animal when working ahead of the other ones.

I have described my invention as being constructed of metal, and have used the word "chains;" but intend to be understood as describing these as the best materials of which to construct it, and not to exclude me from using their equivalents.

The whiffletree can be suspended under the animals by any suitable device attached to the suspension hooks or rings E E and L.

Having thus fully described my invention, what I claim, and desire to secure by Letters Patent, is—

1. The T-joint F, in combination with an evener and singletree, substantially as described.

2. The combination of the double evener B, having hook-formed inner ends, extensions C, having hook-formed outer ends, and lock pins or bolts, substantially as described.

3. The combination of the evener B, extension C, center whiffletrees A, and joint G, constructed substantially as described.

4. The combination of the evener B, extension C, whiffletrees A, draw-bar D, and stay-chains K K, substantially as described.

In testimony that I claim the foregoing I have hereunto set my hand this 21st day of March, 1878.

STEPHEN J. WHITE.

Witnesses:
　J. WILBUR PARROTT,
　SAMUEL MCDONALD.